Patented Mar. 1, 1927.

1,619,036

UNITED STATES PATENT OFFICE.

ANDREAS JOHAN RAVNESTAD, OF FREDRIKSSTAD, NORWAY.

CLARIFYING AND PURIFYING LIQUIDS AND WASTE WATERS.

No Drawing. Application filed October 26, 1923, Serial No. 671,052, and in Norway September 28, 1920.

The present invention relates to processes for clarifying and purifying liquids and waste waters containing suspended organic, mineral or colloidal matters, whereby the coagulating or flocculating capability of organic colloids is combined with the introduction of solids, liquids or gaseous substances acting as settling accelerators.

One of the most important factors in all clarification problems is the settling rate as the object is to have the suspended particles separate out in tanks of proper dimensions within the shortest possible time.

In many chemical and allied industries, organic colloids are used in the flocculation and settling of colloidal precipitates or suspended matters. This is especially the case in liquids containing colloidal matters and exceedingly fine slimes, which on account of the small size of the particles have difficulty in sinking to the bottom, and also in liquids in which the suspended substances, for instance fibres, have so small a specific gravity relatively to the liquid that for this reason it will be impossible to separate out the suspended particles.

My investigations have shown that it is possible to increase the settling rate of coagulated or flocculated suspended particles by employing colloids capable of coagulation in combination with an addition of substances acting as settling accelerators or substances rising to the surface of the liquid. Thereby it is made possible to have a sedimentation process finished or to clarify a liquid within a shorter time than otherwise required. Consequently the clarifying vats (settling area) employed may be reduced considerably in size.

My process for purifying liquids and waste waters thus consists in adding organic colloids, preferably from sea weed to the liquid in question, and then before, during or after the coagulation or flocculation process introducing solid, liquid, or gaseous substances acting as settling accelerators or rising to the surface thereby increasing the settling rate of the originally suspended matters which become flocculated and absorbed by the coagulated organic substance and then mechanically removed by the settling accelerator.

I have herein used the term flocculation to cover any operation by which the suspension of colloid or mineral matters is changed from a multitude of fine particles to a relatively small number of flocks. I use the common methods to cause flocculation by adding to small quantities of colloids an electrolyte, such as an acid, salt or an alkali, alone or mixed, if such are not already present in the liquid to be clarified. Soluble colloids from sea weeds known as alginates of soda, ammonia, etc., easily form insoluble compounds such as alginic acids, calcium alginate, etc. These are in form of countless small jelly-like particles which gradually ball up to small flocks serving to absorb the originally suspended particles and thus subject them to the mechanical action of the substances added. If the substance added has a higher specific gravity than the liquid in question, it will mechanically accelerate the settling of the suspended matter and if its specific gravity is lower than that of the liquid it will while rising to the surface mechanically bring along the suspended matter which will collect at the surface of the liquid. It is of importance that the liquid be in motion during the coagulation and flocculation so as to bring the jelly like particles in touch with the suspended particles, both the original ones and those added. The introduction of solids, liquids, or gaseous substances should therefore also take place in such a manner that they be present in a multitude of finely divided particles in the liquid when the flocculation takes place.

The addition of solids, liquids or gaseous substances may, as stated, take place before, during or after the flocculation, and the process may thus be varied in each single case. As the most finely suspended particles, often having the size of true colloids, are easily kept in suspension on account of their electric charge the addition may be chosen so as to give an electric charge neutralizing the charge of the original substances, whereby the condition of stability is disturbed and precipitation effected. I accomplish this by introducing a substance of opposite polarity.

Liquids containing suspended substances of a low specific gravity are difficult to clarify by settling because the colloids with the adsorbed original particles often remain in suspension after flocculation. In this case I effect a rapid clarification and removal by introducing finely divided gas-bubbles which adhere to the jelly particles and make them rise to the surface of the liquid together with the suspended particles. I may introduce the gas-bubbles by means of emulsifiers, by pressure, electrolysis, chemical reactions (as for instance formation of carbonic acid) and in other known ways. I may also take out a part of the liquid to be clarified or employ another liquid and send this through a suitable apparatus for introducing gas bubbles and then mix it with the liquid to be clarified.

In order to illustrate my invention some practical examples are given below, but my process is of course not limited to these special forms of the invention, as it may be varied to suit the conditions in each case.

*Example 1.*—To a liquid containing finely suspended slimes was added a weak solution of alginate which flocculated during stirring. On account of high specific gravity of the liquid the settling took place very slowly and was not complete. Then suspended heavy mineral powder was added as a settling accelerator and the coagulated alginate was rapidly swept to the bottom of the clarifying vat, bringing down the finely suspended slimes, thus permitting the removal of a clear supernatant liquid.

*Example 2.*—Oil containing suspended solids was heated and a weak coagulated solution of alginate was added under stirring. Then powdered mineral barium sulphate of even fineness was stirred up in the oil. The jelly-like alginate particles absorbing the suspended solids were then brought down by the barium sulphate and the settling was finished within a short time.

*Example 3.*—To a sample of waste water from a wood pulp mill containing considerable amounts of suspended fibres was added an alginate solution which was flocculated by the addition of small amounts of lime water, thus forming insoluble jelly-like calcium alginate. At the same time small gas bubbles were developed from electrodes at the bottom of the vessel. The result was that the gas bubbles adhered to the flocculated jelly-like particles which had adsorbed the fibres and rose to the surface of the liquid.

What I claim as new and desire to secure by Letters Patent of the United States is:

1. The process of clarifying and purifying liquids and waste waters containing suspended organic, mineral or colloidal substances comprising the addition of an organic colloid, and of a flocculating agent for coagulating said colloid, and of a settling accelerator.

2. The process of clarifying and purifying liquids and waste waters containing suspended organic, mineral or colloidal substances comprising the addition of an organic colloid, and of an agent for coagulating said colloid and addition of a settling accelerator during the coagulation.

3. The process of clarifying and purifying liquids and waste waters containing suspended substances comprising the addition of alginates and of means for coagulating the same and of a settling accelerator.

4. The process of clarifying and purifying liquids and waste waters containing suspended substances comprising the addition of alginates in the presence of free mineral acid and a settling accelerator.

5. The process of clarifying and purifying liquids and waste waters containing suspended substances comprising the addition of alginates in the presence of sulphuric acid and a settling accelerator.

Signed at Christiania, Norway this 8th day of October 1923.

ANDREAS JOHAN RAVNESTAD.